United States Patent
Cui et al.

(10) Patent No.: US 11,646,781 B2
(45) Date of Patent: May 9, 2023

(54) BEAMFORMED MEASUREMENT FOR NEW RADIO (NR)

(71) Applicant: Apple Inc., Cupertino, CA (US)

(72) Inventors: Jie Cui, San Jose, CA (US); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/543,605

(22) Filed: Dec. 6, 2021

(65) Prior Publication Data

US 2022/0094420 A1 Mar. 24, 2022

Related U.S. Application Data

(63) Continuation of application No. 16/500,351, filed as application No. PCT/US2018/035484 on May 31, 2018, now Pat. No. 11,196,476.

(60) Provisional application No. 62/514,516, filed on Jun. 2, 2017.

(51) Int. Cl.
*H04B 7/08* (2006.01)
*H04B 17/309* (2015.01)

(52) U.S. Cl.
CPC ........... *H04B 7/086* (2013.01); *H04B 17/309* (2015.01)

(58) Field of Classification Search
CPC .............................. H04B 7/086; H04B 17/309
See application file for complete search history.

(56) References Cited

U.S. PATENT DOCUMENTS

| | | | |
|---|---|---|---|
| 8,547,867 B2 | 10/2013 | Koo et al. | |
| 8,625,724 B2 * | 1/2014 | Song | H04B 17/21 375/267 |
| 8,750,216 B2 * | 6/2014 | Ishii | H04L 27/2605 455/67.11 |
| 8,964,587 B2 * | 2/2015 | Ishii | H04L 25/0216 370/252 |
| 9,258,068 B2 * | 2/2016 | Wang | H04B 17/382 |
| 9,585,174 B2 | 2/2017 | Zhu et al. | |

(Continued)

FOREIGN PATENT DOCUMENTS

| | | | | |
|---|---|---|---|---|
| AU | 2010259807 A1 * | 1/2012 | ........... | H04B 17/309 |
| BR | 112019018970 A2 * | 4/2020 | ........... | H04B 7/0408 |

(Continued)

OTHER PUBLICATIONS

3GPP, "Technical Specification Group Radio Access Network; Evolved Universal Terrestrial Radio Access {E-UTRA) User Equipment {UE) antenna test function definition for two-stage Multiple Input Multiple Output {MIMO) Over The Air OTA) test method {Release 13)," 3GPP TR 36.978 V13.2.0 (Jun. 2017), Lie Advanced, 22 pages.

3GPP, "Technical Specification Group Radio Access Network; Evolved Universal Terrestrial Radio Access {E-UTRA); 3 Physical layer; Measurements {Release 14)," 3GPP TS 36.214 V14.2.0 (Mar. 2017), Lie Advanced Pro, 22 pages.

(Continued)

*Primary Examiner* — Berhanu Tadese
(74) *Attorney, Agent, or Firm* — Fish & Richardson P.C.

(57) ABSTRACT

Embodiments of the present disclosure describe methods, apparatuses, storage media, and systems for adequately measuring reference signals while a user equipment (UE) uses beamforming for optimal receiving. Embodiments describe how a UE may measure received-beamformed reference signals as well as how to determine a reported value while multiple beams are measured or a receiver diversity is in use by the UE. Other embodiments may be described and claimed.

24 Claims, 7 Drawing Sheets

(56) References Cited

U.S. PATENT DOCUMENTS

| | | | |
|---|---|---|---|
| 9,609,536 B2 | 3/2017 | Barbieri et al. | |
| 9,860,852 B2* | 1/2018 | Madan | H04W 52/244 |
| 9,942,814 B1* | 4/2018 | Pawar | H04B 7/0617 |
| 10,021,585 B2* | 7/2018 | Kim | H04W 24/10 |
| 10,064,124 B2 | 8/2018 | Lindoff et al. | |
| 10,178,568 B2* | 1/2019 | Yi | H04B 17/318 |
| 10,200,896 B2* | 2/2019 | Choi | H04W 24/10 |
| 10,299,223 B2 | 5/2019 | Jha | |
| 10,321,348 B2* | 6/2019 | Hayashi | H04W 24/10 |
| 10,419,962 B2* | 9/2019 | Axmon | H04W 52/0245 |
| 10,666,384 B2* | 5/2020 | Dalsgaard | H04L 1/0026 |
| 10,764,131 B2* | 9/2020 | Chen | H04L 41/0816 |
| 10,772,000 B2* | 9/2020 | Takahashi | H04W 24/08 |
| 10,798,719 B2* | 10/2020 | Beale | H04W 72/0453 |
| 10,833,750 B2* | 11/2020 | Bhamidipati | H04B 7/0456 |
| 10,856,169 B2* | 12/2020 | Huang | H04W 24/10 |
| 10,863,494 B2 | 12/2020 | Zhang et al. | |
| 10,925,101 B2* | 2/2021 | Huang | H04W 76/11 |
| 11,088,749 B2* | 8/2021 | Chang | H04W 36/0022 |
| 11,108,476 B2* | 8/2021 | Yiu | H04W 24/10 |
| 11,122,450 B2* | 9/2021 | Mukherjee | H04W 24/08 |
| 11,122,544 B2* | 9/2021 | Osawa | H04B 7/0404 |
| 11,177,893 B2* | 11/2021 | Axmon | H04W 24/08 |
| 11,196,476 B2* | 12/2021 | Cui | H04B 17/086 |
| 11,234,219 B2* | 1/2022 | Mondal | H04L 27/261 |
| 11,239,925 B2* | 2/2022 | Kim | H04B 7/088 |
| 11,363,477 B2* | 6/2022 | Yiu | H04W 76/27 |
| 2010/0208603 A1* | 8/2010 | Ishii | H04L 25/023 |
| | | | 370/252 |
| 2013/0033998 A1 | 2/2013 | Seo et al. | |
| 2013/0225188 A1 | 8/2013 | Seo et al. | |
| 2013/0322322 A1 | 12/2013 | Redana et al. | |
| 2014/0126403 A1 | 5/2014 | Siomina et al. | |
| 2014/0128115 A1 | 5/2014 | Siomina et al. | |
| 2014/0139372 A1 | 5/2014 | Seol et al. | |
| 2014/0153427 A1 | 6/2014 | Seo et al. | |
| 2014/0233408 A1 | 8/2014 | Bontu et al. | |
| 2014/0334564 A1 | 11/2014 | Jaspreet et al. | |
| 2015/0043368 A1 | 2/2015 | Kim et al. | |
| 2015/0055555 A1 | 2/2015 | Kim et al. | |
| 2015/0146642 A1 | 5/2015 | Seo et al. | |
| 2015/0208372 A1 | 7/2015 | You et al. | |
| 2015/0264592 A1 | 9/2015 | Novlan et al. | |
| 2016/0029333 A1 | 1/2016 | Seo et al. | |
| 2016/0157267 A1 | 6/2016 | Frenne et al. | |
| 2016/0165465 A1 | 6/2016 | Park et al. | |
| 2016/0183204 A1 | 6/2016 | Seo | |
| 2016/0242052 A1 | 8/2016 | Kazami et al. | |
| 2016/0249243 A1 | 8/2016 | Kim et al. | |
| 2017/0078126 A1 | 3/2017 | Einhaus et al. | |
| 2017/0142746 A1 | 5/2017 | Koorapaty et al. | |
| 2017/0156074 A1 | 6/2017 | Choi | |
| 2017/0339660 A1* | 11/2017 | Kazmi | H04W 64/003 |
| 2017/0359133 A1 | 12/2017 | Kim et al. | |
| 2018/0054244 A1 | 2/2018 | Heejin et al. | |
| 2018/0092139 A1 | 3/2018 | Novlan et al. | |
| 2018/0124642 A1 | 5/2018 | Phuyal et al. | |
| 2018/0192313 A1* | 7/2018 | Axmon | H04W 52/50 |
| 2018/0205427 A1 | 7/2018 | Ghosh et al. | |
| 2018/0227898 A1* | 8/2018 | Noh | H04B 7/02 |
| 2018/0241458 A1 | 8/2018 | Jung et al. | |
| 2018/0262313 A1 | 9/2018 | Nam et al. | |
| 2018/0279143 A1 | 9/2018 | Bhattad et al. | |
| 2019/0020987 A1 | 1/2019 | Khoryaev et al. | |
| 2019/0053013 A1 | 2/2019 | Markhovsky et al. | |
| 2019/0132759 A1 | 5/2019 | Park et al. | |
| 2019/0149252 A1 | 5/2019 | Siomina et al. | |
| 2019/0149307 A1 | 5/2019 | Siomina et al. | |
| 2019/0150187 A1 | 5/2019 | Park et al. | |
| 2019/0165983 A1 | 5/2019 | Nakayama | |
| 2019/0260425 A1 | 8/2019 | Ji et al. | |
| 2019/0268852 A1 | 8/2019 | Ryu et al. | |
| 2019/0313272 A1* | 10/2019 | Zhou | H04W 24/10 |
| 2019/0342807 A1 | 11/2019 | Harada et al. | |
| 2019/0380075 A1 | 12/2019 | Ugurlu et al. | |
| 2020/0037332 A1 | 1/2020 | da Silva et al. | |
| 2020/0059898 A1 | 2/2020 | Osawa | |
| 2020/0092766 A1 | 3/2020 | Alriksson et al. | |
| 2020/0112420 A1 | 4/2020 | Xu et al. | |
| 2020/0128421 A1 | 4/2020 | Yang et al. | |
| 2020/0145062 A1 | 5/2020 | Jung et al. | |
| 2020/0145079 A1 | 5/2020 | Marinier et al. | |
| 2020/0145939 A1 | 5/2020 | Harada et al. | |
| 2020/0245373 A1* | 7/2020 | Xiong | H04L 27/2602 |
| 2020/0267536 A1 | 8/2020 | Zhou et al. | |
| 2020/0296765 A1 | 9/2020 | Kim et al. | |
| 2020/0305098 A1 | 9/2020 | Kim et al. | |
| 2020/0366355 A1 | 11/2020 | Liu et al. | |
| 2020/0404679 A1* | 12/2020 | Beale | H04W 72/085 |
| 2021/0021326 A1 | 1/2021 | Cui et al. | |
| 2021/0136639 A1* | 5/2021 | Osawa | H04B 7/0608 |
| 2021/0153049 A1* | 5/2021 | Cui | H04W 56/001 |
| 2021/0227610 A1* | 7/2021 | Cui | H04W 72/53 |
| 2021/0368572 A1* | 11/2021 | Lim | H04W 56/001 |
| 2021/0385676 A1* | 12/2021 | Yu | H04W 56/001 |
| 2021/0399863 A1* | 12/2021 | Yu | H04B 17/327 |
| 2022/0046454 A1* | 2/2022 | Yiu | H04W 24/10 |
| 2022/0094420 A1* | 3/2022 | Cui | H04B 17/309 |

FOREIGN PATENT DOCUMENTS

| | | | | |
|---|---|---|---|---|
| BR | 112019019372 A2 * | 4/2020 | | H04B 7/0626 |
| CN | 101779428 A * | 7/2010 | | H04B 1/7113 |
| CN | 102739602 A * | 10/2012 | | H04B 1/7113 |
| CN | 102761514 A * | 10/2012 | | H04B 1/7113 |
| CN | 102761514 B * | 7/2015 | | H04B 1/7113 |
| CN | 102739602 B * | 3/2016 | | H04B 1/7113 |
| CN | 106465374 A * | 2/2017 | | H04B 17/309 |
| CN | 107182093 A * | 9/2017 | | H04W 36/0066 |
| CN | 107710806 A * | 2/2018 | | H04B 17/24 |
| CN | 108347270 A * | 7/2018 | | |
| CN | 108352909 A * | 7/2018 | | H04B 17/26 |
| CN | 108810931 A * | 11/2018 | | H04B 17/309 |
| CN | 109155929 A * | 1/2019 | | H04B 17/309 |
| CN | 110463251 A * | 11/2019 | | H04B 7/0626 |
| CN | 110582947 A * | 12/2019 | | H04B 7/0404 |
| CN | 110603737 A * | 12/2019 | | H04B 17/309 |
| CN | 106465374 B * | 11/2020 | | H04B 17/309 |
| CN | 107710806 B * | 8/2021 | | H04B 17/24 |
| EP | 2180620 A1 * | 4/2010 | | H04B 1/7113 |
| EP | 3125618 A1 * | 2/2017 | | H04B 17/309 |
| EP | 3322215 A1 * | 5/2018 | | H04B 17/24 |
| EP | 3125618 B1 * | 7/2018 | | H04B 17/309 |
| EP | 2702709 B1 * | 1/2019 | | H04B 17/309 |
| EP | 3218737 B1 * | 1/2019 | | H04B 17/309 |
| EP | 3183829 B1 * | 8/2019 | | H04B 17/309 |
| EP | 3453125 B1 * | 11/2019 | | H04B 17/309 |
| EP | 3631996 A1 * | 4/2020 | | H04B 17/309 |
| EP | 3322215 B1 * | 11/2020 | | H04B 17/24 |
| EP | 3399806 B1 * | 11/2020 | | H04B 17/309 |
| EP | 3403446 B1 * | 2/2021 | | H04B 17/309 |
| EP | 3820074 A1 * | 5/2021 | | H04B 17/309 |
| EP | 3854131 A1 * | 7/2021 | | H04L 5/0048 |
| EP | 3868148 A1 * | 8/2021 | | |
| EP | 3353914 B1 * | 12/2021 | | H04B 17/26 |
| EP | 3985889 A1 * | 4/2022 | | H04B 17/26 |
| GB | 2519002 A * | 4/2015 | | H04B 7/086 |
| JP | 2012257263 A * | 12/2012 | | H04B 1/7113 |
| JP | 2013197828 A * | 9/2013 | | H04W 36/00 |
| JP | 5528510 B2 * | 6/2014 | | H04B 1/7113 |
| JP | 6099869 B2 * | 3/2017 | | H03L 7/107 |
| JP | 2017082810 | 5/2017 | | |
| JP | 6158207 B2 * | 7/2017 | | H04W 24/10 |
| JP | 6224272 B2 * | 11/2017 | | H04J 11/0073 |
| JP | 2018137495 A * | 8/2018 | | H04B 17/24 |
| JP | 6568058 B2 * | 8/2019 | | H04B 17/309 |
| JP | 7100016 B2 * | 7/2022 | | H04B 7/0408 |
| TW | 201722106 A * | 6/2017 | | H04W 72/046 |
| WO | WO-2010104980 A1 * | 9/2010 | | H03L 7/107 |
| WO | WO-2012146294 A1 * | 11/2012 | | H04B 17/309 |
| WO | WO-2015069055 A1 * | 5/2015 | | H04B 17/24 |
| WO | WO-2015182742 A1 * | 12/2015 | | H04B 17/309 |
| WO | WO-2016028116 A1 * | 2/2016 | | H04B 17/309 |
| WO | WO 2016153120 | 9/2016 | | |

(56) References Cited

FOREIGN PATENT DOCUMENTS

| WO | WO-2016167578 A1 * | 10/2016 | ........ H04W 28/0268 |
|---|---|---|---|
| WO | WO-2017010379 A1 * | 1/2017 | ............ H04B 17/24 |
| WO | WO 2017027055 | 2/2017 | |
| WO | WO 2017034606 | 3/2017 | |
| WO | WO-2017050973 A1 * | 3/2017 | ............ H04B 17/26 |
| WO | WO 2017067138 | 4/2017 | |
| WO | WO-2017074488 A1 * | 5/2017 | .......... H04B 17/327 |
| WO | WO 2017080132 | 5/2017 | |
| WO | WO 2017082810 | 5/2017 | |
| WO | WO-2017121618 A2 * | 7/2017 | .......... H04B 17/309 |
| WO | WO-2017146758 A1 * | 8/2017 | .......... H04B 7/0626 |
| WO | WO-2017146773 A1 * | 8/2017 | .......... H04W 52/40 |
| WO | WO-2017164925 A1 * | 9/2017 | ............ G01S 1/08 |
| WO | WO-2017191012 A1 * | 11/2017 | .......... H04B 17/309 |
| WO | WO-2018031138 A1 * | 2/2018 | .......... H04W 24/10 |
| WO | WO 2018064124 | 4/2018 | |
| WO | WO-2018113946 A1 * | 6/2018 | ............ H04B 17/24 |
| WO | WO-2018113947 A1 * | 6/2018 | |
| WO | WO-2018151341 A1 * | 8/2018 | ............ H04B 17/24 |
| WO | WO-2018173163 A1 * | 9/2018 | .......... H04B 7/0626 |
| WO | WO 2018222931 | 12/2018 | |
| WO | WO-2018222931 A1 * | 12/2018 | .......... H04B 17/309 |
| WO | WO-2019005846 A1 * | 1/2019 | .......... H04B 17/309 |
| WO | WO-2020131753 A1 * | 6/2020 | ........ H04W 28/0236 |

OTHER PUBLICATIONS

3GPP, "Technical Specification Group Radio Access Network; Evolved Universal Terrestrial Radio Access {E-UTRA); 4 Physical channels and modulation {Release 14)," 3GPP TS 36.211 V14.2.0 (Mar. 2017), Lie Advanced Pro, pp. 1-19f.

3GPP, "Technical Specification Group Radio Access Network; NR; Physical channels and modulation {Release 15)," 3GPP TS 38.211 V1 .0.0 (Sep. 2017), 5G, 37 pages.

3GPP, "Technical Specification Group Radio Access Network; NR; Physical layer measurements {Release 15)," 3GPP Ts 38.215 V1 .o.o (Sep. 2017), 5G, 10 pages.

3GPP, "Technical Specification Group Radio Access Network; NR; Physical layer procedures for control {Release 15)," 3GPP TS 38.213 V1 .0.0 (Sep. 2017), 5g, 16 pages.

3GPP, "Technical Specification Group Radio Access Network; Study on test methods for New Radio; {Release 15)," 3GPP TR 38.810 V2.3.0 (Aug. 2018), 5G, 94 pages.

3GPP, "Technical Specification Group Radio Access Network; Universal Terrestrial Radio Access {UTRA) and 3GPP, Technical Specification Group Radio Access Network; Universal Terrestrial Radio Access {UTRA) and Evolved Universal Terrestrial Radio Access {E-UTRA); Verification of radiated multi-antenna reception performance of User Equipment {UE) {Release 14)," 3GPP TR 37.977 V14.4.0 (Jun. 2017), Lie Advanced Pro, 189 pages.

ETSI, "5G; NR; Physical layer measurement," {3GPP TS 38.215 version 15.2.0 Release 15), ETSI TS 138 215 V15.2.! Jul. 2018), 18 pages.

Huawei, "On UL control channel for URLLC," 3GPP TSG RAN WG1 Meeting #88bis, R1-1705089, Spokane, USA, Apr. 3-7, 2017, 3 pages.

Intel Corporation et al., New SID on Study on test methods for New Radio, 3GPP TSG RAN Meeting #77, RP-171828, Agenda Item: 9.3.9, {revision of RP-171021), Sep. 11-14, 2017, Sapporo, Japan, 4 pages.

Intel et al., "Technical Specification Group Radio Access Network; Study on test methods for New Radio; {Release 6 15)," TR 38.810 V1 .0.1, 3GPP TSG-RAN WG4 AH Meeting #1801, R4-1700341, Agenda item: 4.7.1, Jan. 22-J6, 2018, San Diego, USA, 33 pages.

Intel et al., WF on performance testing for FR2, 3GPP TSG-RAN WG4 NR Adhoc 1801, R4-1801288, Agenda tern: 4.7.6, Jan. 22-26, 2018, San Diego, USA, 3 pages.

PCT International Preliminary Report on Patentability in International Appln. No. PCT/US2018/035484, dated Dec. 3, 2019, 10 pages.

PCT International Search Report and Written Opinion in International Appln. No. PCT/US2018/035484, dated Septembers, 2018, 13 pages.

Qualcomm Incorporated, "Beam management for NR," 3GPP TSG-RAN1 NR #AdHoc, R1-1700800, Jan. 16-20, 2017, 7 pages.

Qualcomm Incorporated, "Considerations of RLM/RLF and beam recovery in NR," 3GPP TSG RAN WG2 #98, R2-1705089, Hangzhou, China, May 15-19, 2017, 4 pages.

Qualcomm, "Beam Management for NR," 3GPP TSG RAN1 Meeting #88, R1-1702604, Agenda Item: 8.1.2.2.1, Feb. 13-17, 2017, Athens, Greece, 8 pages.

Intel Corporation, "Remaining issues on consolidation beams to cell quality," 3GPP TSG RAN WG2 #98, R2-1704765, Hangzhou, China, May 15-19, 2017, 4 pages.

* cited by examiner

BEAMFORMED MEASUREMENT FOR NEW RADIO (NR)

CROSS REFERENCE TO RELATED APPLICATION

The present application is a continuation of U.S. patent application Ser. No. 16/500,351, filed Oct. 2, 2019, entitled "BEAMFORMED MEASUREMENT FOR NEW RADIO (NR), which is a national phase entry under 35 U.S.C. § 371 of International Application No. PCT/US2018/035484, filed May 31, 2018, entitled "BEAMFORMED MEASUREMENT FOR NEW RADIO (NR)," which claims priority to U.S. Provisional Patent Application No. 62/514,516, filed Jun. 2, 2017, entitled "Beamformed measurement for new radio (NR)," the entire disclosures of which are hereby incorporated by reference.

FIELD

Embodiments of the present invention relate generally to the technical field of wireless communications.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Existing reference signal measurements may not be applicable in developing wireless networks. New solutions are needed in this regard.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
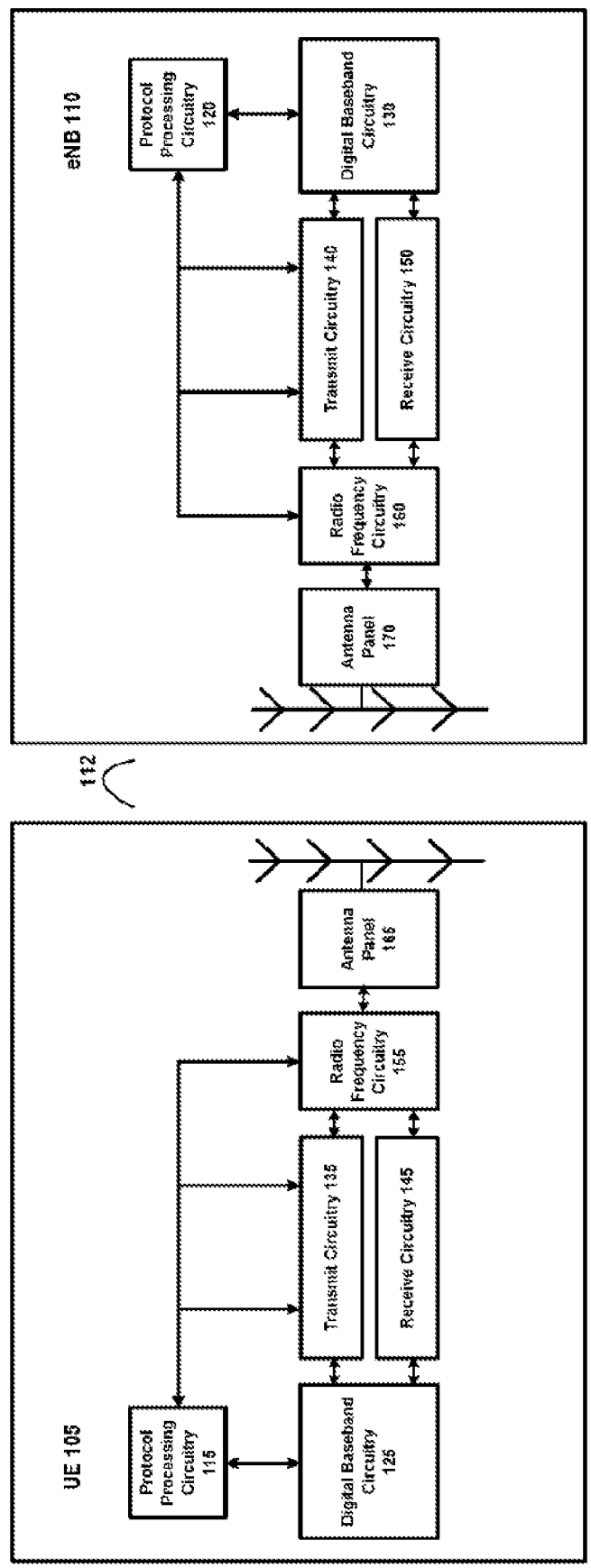
FIG. 1 schematically illustrates an example of a network comprising a user equipment (UE) and an evolved Node B (eNB) in a wireless network, in accordance with various embodiments.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" mean (A), (B), or (A and B). For the purposes of the present disclosure, the phrases "A, B, or C" and "A, B, and/or C" mean (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include any combination of integrated circuits (for example, a field-programmable gate array (FPGA), an application specific integrated circuit (ASIC), etc.), discrete circuits, combinational logic circuits, system on a chip (SOC), system in a package (SiP), that provides the described functionality. In some embodiments, the circuitry may execute one or more software or firmware modules to provide the described functions. In some embodiments, circuitry may include logic, at least partially operable in hardware.

In Long Term Evolution (LTE) communications, while a reference signal is received by a UE, a receiver (Rx) chain may measure, for example, a reference signal received power (RSRP) referenced at the antenna connector of the Rx chain. Then, the UE may determine a value to indicate the measured RSRP based on pre-determined tables and report that value. When more than one Rx chain are used for receiver diversity, individual Rx chains may generate individual values corresponding to individual RSRPs measured at individual Rx chains. Then, the reported value shall not be lower than the corresponding RSRP of any of the individual diversity branches, according to 3rd Generation Partnership Project (3GPP) Technical Specification (TS) 36.214 v14.2.0 (Mar. 23, 2017). Another example is measuring reference signal receive quality (RSRQ) referenced at the antenna connector of the Rx chain. Complete definitions for RSRP and RSRQ in TS 36.214 are detailed in Table 1 and Table 2, respectively. Similar implementations are used for measurements of received signal strength indicator (RSSI) and reference signal-signal to noise and interference ratio (RS-SINR).

TABLE 1

| | |
|---|---|
| Definition | Reference signal received power (RSRP), is defined as the linear average over the power contributions (in [W]) of the resource elements that carry cell-specific reference signals within the considered measurement frequency bandwidth.<br>For RSRP determination, the cell-specific reference signals $R_0$ according to TS 36.211 [3] shall be used. If the UE can reliably detect that $R_1$ is available, it may use $R_1$ in addition to $R_0$ to determine RSRP.<br>If higher layers indicate measurements based on discovery signals, the UE shall measure RSRP in the subframes in the configured discovery signal occasions. If the UE can reliably detect that cell-specific reference signals are present in other subframes, the UE may use those subframes in addition to determine RSRP.<br>The reference point for the RSRP shall be the antenna connector of the UE.<br>If receiver diversity is in use by the UE, the reported value shall not be lower than the corresponding RSRP of any of the individual diversity branches. |
| Applicable for | RRC_IDLE intra-frequency,<br>RRC_IDLE inter-frequency,<br>RRC_CONNECTED intra-frequency,<br>RRC_CONNECTED inter-frequency |

TABLE 2

| | |
|---|---|
| Definition | Reference signal received quality (RSRQ) is defined as the ratio N × RSRP/(E-UTRA carrier RSSI), where N is the number of RBs of the E-UTRA carrier RSSI measurement bandwidth. The measurements in the numerator and denominator shall be made over the same set of resource blocks.<br>E-UTRA carrier received signal strength indicator (RSSI), comprises the linear average of the total received power (in [W]) observed only in certain OFDM symbols of measurement subframes, in the measurement bandwidth, over N number of resource blocks by the UE from all sources, including co-channel serving and non-serving cells, adjacent channel interference, thermal noise, etc.<br>Unless indicated otherwise by higher layers, RSSI is measured only from OFDM symbols containing reference symbols for antenna port 0 of measurement subframes.<br>If higher layers indicate all OFDM symbols for performing RSRQ measurements, then RSSI is measured from all OFDM symbols of the DL part of measurement subframes. If higher layers indicate certain subframes for performing RSRQ measurements, then RSSI is measured from all OFDM symbols of the DL part of the indicated subframes.<br>If higher layers indicate measurements based on discovery signals, RSSI is measured from all OFDM symbols of the DL part of the subframes in the configured discovery signal occasions.<br>The reference point for the RSRQ shall be the antenna connector of the UE.<br>If receiver diversity is in use by the UE, the reported value shall not be lower than the corresponding RSRQ of any of the individual diversity branches. |
| Applicable for | RRC_IDLE intra-frequency,<br>RRC_IDLE inter-frequency,<br>RRC_CONNECTED intra-frequency,<br>RRC_CONNECTED inter-frequency |

Various embodiments describe apparatuses, methods, and storage media for configuring measurements of a reference signal received by a UE while the UE may utilize one or more antenna panels for beamforming. In fifth generation (5G) new radio (NR) communications, a UE may utilize beamforming techniques for receiving and/or transmitting signals, especially while operating at millimeter wave (mmWave) frequency and sub mmWave frequency. An antenna panel may include a plurality of antennas or antenna elements that form one or more beams, so that an antenna gain or beamforming gain may improve the receiving signal power level to enhance the UE's receiving capability. Thus, reference signals may be measured as receive-beamformed signals. Individual Rx chains may further receive such receive-beamformed signals after the beamforming process by the antenna panel. In some embodiments, more than one panel may be used. It is noted that antennas and antenna elements are used interchangeably herein.

FIG. 1 schematically illustrates an example wireless network 100 (hereinafter "network 100") in accordance with various embodiments herein. The network 100 may include a UE 105 wirelessly communicated with one eNB 110. In some embodiments, the network 100 may be a 5G NR network, a radio access network (RAN) of a third generation partnership project (3GPP) LTE network, such as evolved universal terrestrial radio access network (E-UTRAN), a NextGen RAN (NG RAN), or some other type of RAN. The UE 105 may be configured to connect, for example, to be communicatively coupled, with the eNB 110. In this example, the connection 112 is illustrated as an air interface to enable communicative coupling, and can be consistent with cellular communications protocols such as a 5G NR protocol operating at mmWave and sub-mmWave, a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, and the like.

The UE 105 is illustrated as a smartphone (for example, a handheld touchscreen mobile computing device connectable to one or more cellular networks), but may also comprise any mobile or non-mobile computing devices, such as a Personal Data Assistant (PDA), pager, laptop computer, desktop computer, wireless handset, or any computing device including a wireless communications interface. In some embodiments, the UE 105 can comprise a narrowband Internet of Things (NB-IoT) UE, which can comprise a network access layer designed for low-power NB-IoT applications utilizing short-lived UE connections. An NB-IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An NB-IoT/MTC network describes interconnecting NB-IoT/MTC UEs, which may include uniquely identifiable embedded computing devices (within the Internet infrastructure), with short-lived connections. The NB-IoT/MTC UEs may execute background applications (for example, keep-alive message, status updates, location related services, etc.).

The eNB 110 can enable or terminate the connection 112. The eNB 110 can be referred to as a base station (BS), NodeB, evolved NodeB (eNB), next Generation NodeB (gNB), RAN node, serving cell, and so forth, and can comprise ground stations (for example, terrestrial access points) or satellite stations providing coverage within a geographic area (for example, a cell).

The eNB 110 can be the first point of contact for the UE 105. In some embodiments, the eNB 110 can fulfill various logical functions including, but not limited to, radio network controller (RNC) functions such as radio bearer management, uplink and downlink dynamic radio resource management and data packet scheduling, and mobility management.

In some embodiments, a downlink resource grid can be used for downlink transmissions from any of the RAN nodes, for example, the eNB 110 to the UE 105, while uplink transmissions can utilize similar techniques. The grid can be a time-frequency grid, called a resource grid or time-frequency resource grid, which is the physical resource in the downlink in each slot. Such a time-frequency plane representation is a common practice for orthogonal frequency division multiplexing (OFDM) systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 105. The physical downlink control channel (PDCCH) may carry information about the transport format and resource allocations related to the PDSCH channel, among other things. It may also inform the UE 105 about the transport format, resource allocation, and hybrid automatic repeat request (HARQ) information related to the uplink shared channel. Typically, downlink scheduling (assigning control and shared channel resource blocks to the UE 105 within a cell) may be performed at the eNB 110 based on channel quality information fed back from any of the UE 105. The downlink resource assignment information may be sent on the PDCCH used for (for example, assigned to) the UE 105.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (for example, aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as enhanced resource element groups (EREGs). An ECCE may have other numbers of EREGs in some situations.

As shown in FIG. 1, the UE 105 may include millimeter wave communication circuitry grouped according to functions. The circuitry shown here is for illustrative purposes and the UE 105 may include other circuitry not shown here in FIG. 1. The UE 105 may include protocol processing circuitry 115, which may implement one or more of layer operations related to medium access control (MAC), radio link control (RLC), packet data convergence protocol (PDCP), radio resource control (RRC) and non-access stratum (NAS). The protocol processing circuitry 115 may include one or more processing cores (not shown) to execute instructions and one or more memory structures (not shown) to store program and data information.

The UE 105 may further include digital baseband circuitry 125, which may implement physical layer (PHY) functions including one or more of HARQ functions, scrambling and/or descrambling, coding and/or decoding, layer mapping and/or demapping, modulation symbol mapping, received symbol and/or bit metric determination, multi-antenna port pre-coding and/or decoding, which may include one or more of space-time, space-frequency or spatial coding, reference signal generation and/or detection, preamble sequence generation and/or decoding, synchronization sequence generation and/or detection, control channel signal blind decoding, and other related functions.

The UE 105 may further include transmit circuitry 135, receive circuitry 145, radio frequency (RF) circuitry 155, and/or one or more antenna panels 165.

In some embodiments, RF circuitry 155 may include multiple parallel RF chains or branches for one or more of transmit or receive functions; each chain or branch may be coupled to one antenna panel 165.

In some embodiments, the protocol processing circuitry 115 may include one or more instances of control circuitry (not shown) to provide control functions for the digital baseband circuitry 125 (or simply, "baseband circuitry 125"), transmit circuitry 135, receive circuitry 145, radio frequency circuitry 155, and/or one or more antenna panels 165.

A UE reception may be established by and via the one or more antenna panels 165, RF circuitry 155, digital baseband circuitry 125, and the protocol processing circuitry 115. The one or more antenna panels 165 may receive a transmission from an eNB 110 by receive-beamforming signals received by a plurality of antennas/antenna elements of the one or more antenna panels 165. Further details regarding the UE 105 architecture are illustrated in FIGS. 2, 3, 4, and 6. In some embodiments, the baseband circuitry 125 may contain both the transmit circuitry 135 and the receive circuitry 145. In other embodiments, the baseband circuitry 125 may be implemented in separate chips or modules, for example, one chip including the transmit circuitry 135 and another chip including the receive circuitry 145.

In some embodiments, the UE 105 may include similar circuitry components as illustrated above, but suitable for operating at sub-mmWave frequency. In one example, mmWave refers to a frequency range above 24 GHz and sub-mmWave refers to a frequency range above microwave frequency and below 24 GHz. It is noted that the range of mmWave and sub-mmWave are not dictated by one particular number, but are used for distinguishing from existing LTE operation below 6 GHz.

Similar to the UE 105, the eNB 110 may include millimeter wave communication circuitry grouped according to functions. The eNB 110 may include protocol processing circuitry 120, digital baseband circuitry 130, transmit circuitry 140, receive circuitry 150, radio frequency (RF) circuitry 160, and/or one or more antenna panels 170.

Figure 2:
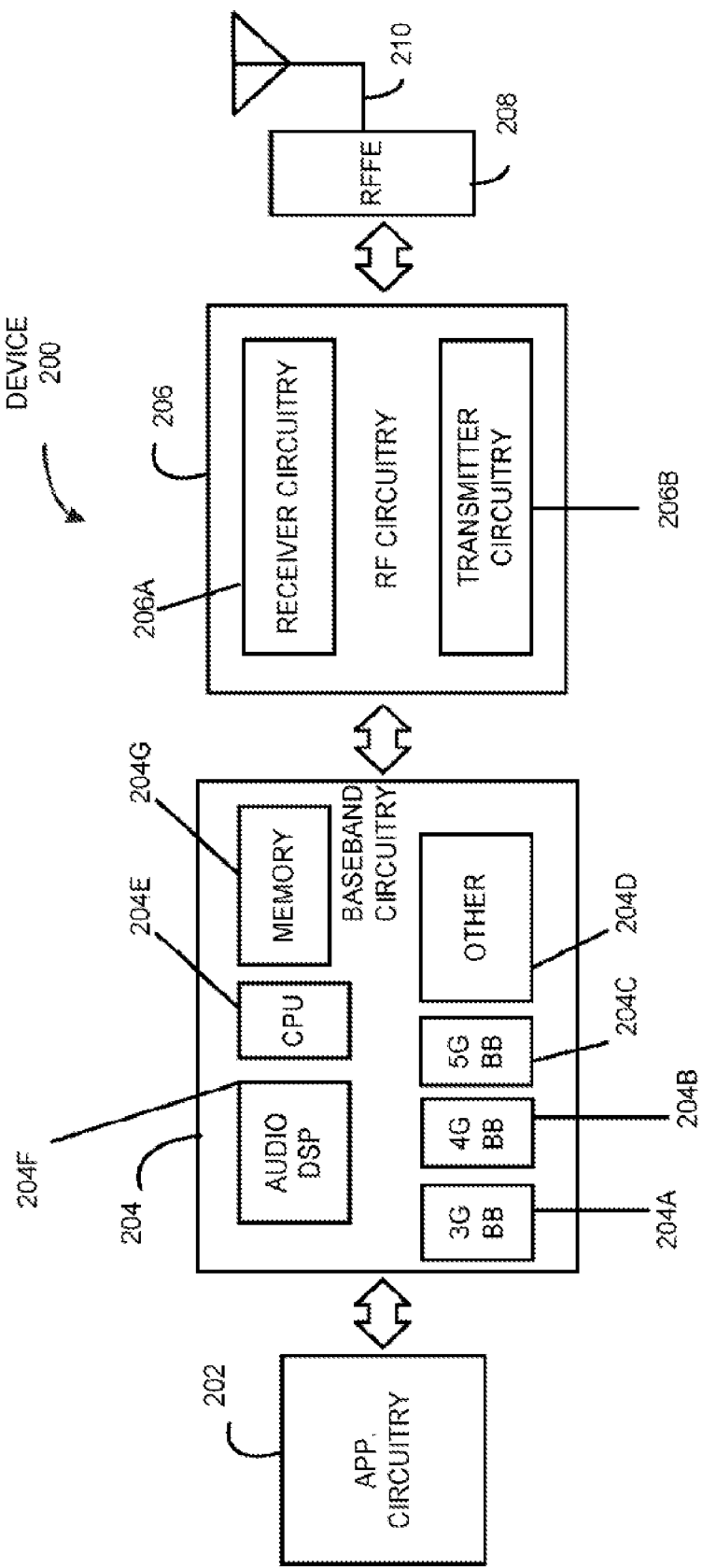
FIG. 2 illustrates example components of a device in accordance with various embodiments.
Figure 3:
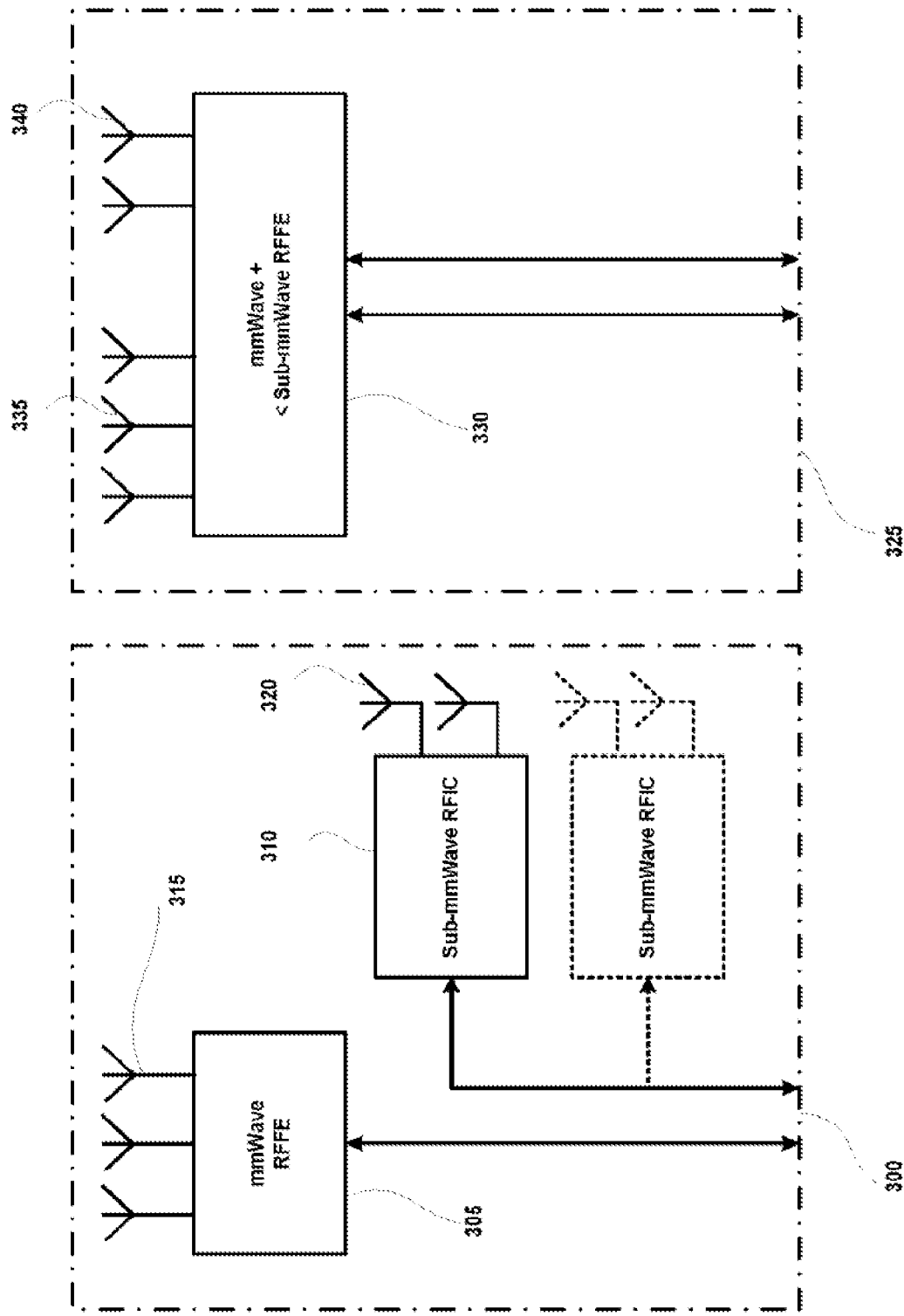
FIG. 3A illustrates a radio front end incorporating a mmWave radio front end and one or more sub-millimeter wave radio frequency integrated circuits.
FIG. 3B illustrates an alternative radio front end.

FIG. 2 illustrates example components of a device 200 in accordance with some embodiments. In some embodiments, the device 200 may include application circuitry 202, baseband circuitry 204, RF circuitry 206, radio-frequency front end (RFFE) circuitry 208, and a plurality of antennas 210 together at least as shown. The baseband circuitry 204 may be similar to and substantially interchangeable with the baseband circuitry 125 in some embodiments. The plurality of antennas 210 may constitute one or more antenna panels for beamforming. The components of the illustrated device 200 may be included in a UE or an eNB. In some embodiments, the device 200 may include fewer elements (for example, an eNB may not utilize the application circuitry 202, and instead include a processor/controller to process IP data received from an evolved packet core (EPC)). In some embodiments, the device 200 may include additional elements such as, for example, a memory/storage, display, camera, sensor, or input/output (I/O) interface. In other embodiments, the components described below may be included in more than one device (for example, said circuitry may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors and dedicated processors (for example, graphics processors, application processors, etc.). The processors may be coupled with or may include memory/storage and may be configured to execute instructions stored in the memory/storage to enable various applications or operating systems to run on the device 200. In some embodiments, processors of application circuitry 202 may process IP data packets received from an EPC.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband circuitry 204 may interface with the application circuitry 202 for generation and processing of the baseband signals and for controlling operations of the RF circuitry 206. For example, in some embodiments, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (for example, second generation (2G), sixth generation (6G), etc.). The baseband circuitry 204 (for example, one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a central processing unit (CPU) 204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include one or more audio digital signal processor(s) (DSP) 204F. The audio DSP(s) 204F may be include elements for compression/decompression and echo cancellation and may include other suitable processing elements in other embodiments. Components of the baseband circuitry may be suitably combined in a single chip, in a single chipset, or disposed on a same circuit board in some embodiments. In some embodiments, some or all of the constituent components of the baseband circuitry 204 and the application circuitry 202 may be implemented together such as, for example, on a SOC.

In some embodiments, the baseband circuitry 204 may provide for communication compatible with one or more radio technologies. For example, in some embodiments, the baseband circuitry 204 may support communication with an evolved universal terrestrial radio access network (E-UTRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include one or more switches, filters, amplifiers, etc. to facilitate the communication with the wireless network. RF circuitry 206 may include receiver circuitry 206A, which may include circuitry to down-convert RF signals received from the RFFE circuitry 208 and provide baseband signals to the baseband circuitry 204. RF circuitry 206 may also include transmitter circuitry 206B, which may include circuitry to up-convert baseband signals provided by the baseband circuitry 204 and provide RF output signals to the RFFE circuitry 208 for transmission.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio integrated circuit (IC) circuitry may be provided for processing signals for each spectrum, although the scope of the embodiments is not limited in this respect.

RFFE circuitry 208 may include a receive signal path, which may include circuitry configured to operate on RF signals received from one or more antennas 210 and beamformed by a panel of the antennas 210 while operating at millimeter wave frequency, amplify the received signals and provide the amplified versions of the received signals to the RF circuitry 206 for further processing. RFFE circuitry 208 may also include a transmit signal path, which may include circuitry configured to amplify signals for transmission provided by the RF circuitry 206 for transmission by one or more of the antennas 210, with or without beamforming. In various embodiments, the amplification through transmit or receive signal paths may be done solely in the RF circuitry 206, solely in the RFFE 208, or in both the RF circuitry 206 and the RFFE 208.

In some embodiments, the RFFE circuitry 208 may include a TX/RX switch to switch between transmit mode and receive mode operation. The RFFE circuitry 208 may include a receive signal path and a transmit signal path. The receive signal path of the RFFE circuitry 208 may include an low noise amplifier (LNA) to amplify received RF signals and provide the amplified received RF signals as an output (for example, to the RF circuitry 206). The transmit signal path of the RFFE circuitry 208 may include a power amplifier (PA) to amplify input RF signals (for example, provided by RF circuitry 206), and one or more filters to generate RF signals for subsequent transmission (for example, by one or more of the one or more antennas 210).

Processors of the application circuitry 202 and processors of the baseband circuitry 204 may be used to execute elements of one or more instances of a protocol stack. For example, processors of the baseband circuitry 204, alone or in combination, may be used to execute Layer 3, Layer 2, or Layer 1 functionality, while processors of the application circuitry 202 may utilize data (for example, packet data) received from these layers and further execute Layer 4 functionality (for example, transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/eNB, described in further detail below.

FIG. 3A illustrates an embodiment of a radio front end 300 incorporating a mmWave radio-frequency front end (RFFE) 305 and one or more sub-millimeter wave radio frequency integrated circuits (RFIC) 310. The RFFE 305 may be similar to and substantially interchangeable with the RFFE 208 in some embodiments.

In this embodiment, the one or more sub-mmWave RFICs 310 (or simply "RFICs 310") may be physically separated from the mmWave RFFE 305. RFICs 310 may include connection to one or more antennas 320. RFFE 305 may be coupled with multiple antennas 315, which may constitute one or more antenna panels.

FIG. 3B illustrates an alternate embodiment of a radio front end module 325. In this aspect both millimeter wave and sub-millimeter wave radio functions may be implemented in the same physical RFFE 330. RFFE 330 may incorporate both millimeter wave antennas 335 and sub-millimeter wave antennas 340. The RFFE 330 may be similar to and substantially interchangeable with the RFFE 208 in some embodiments.

Figure 4:
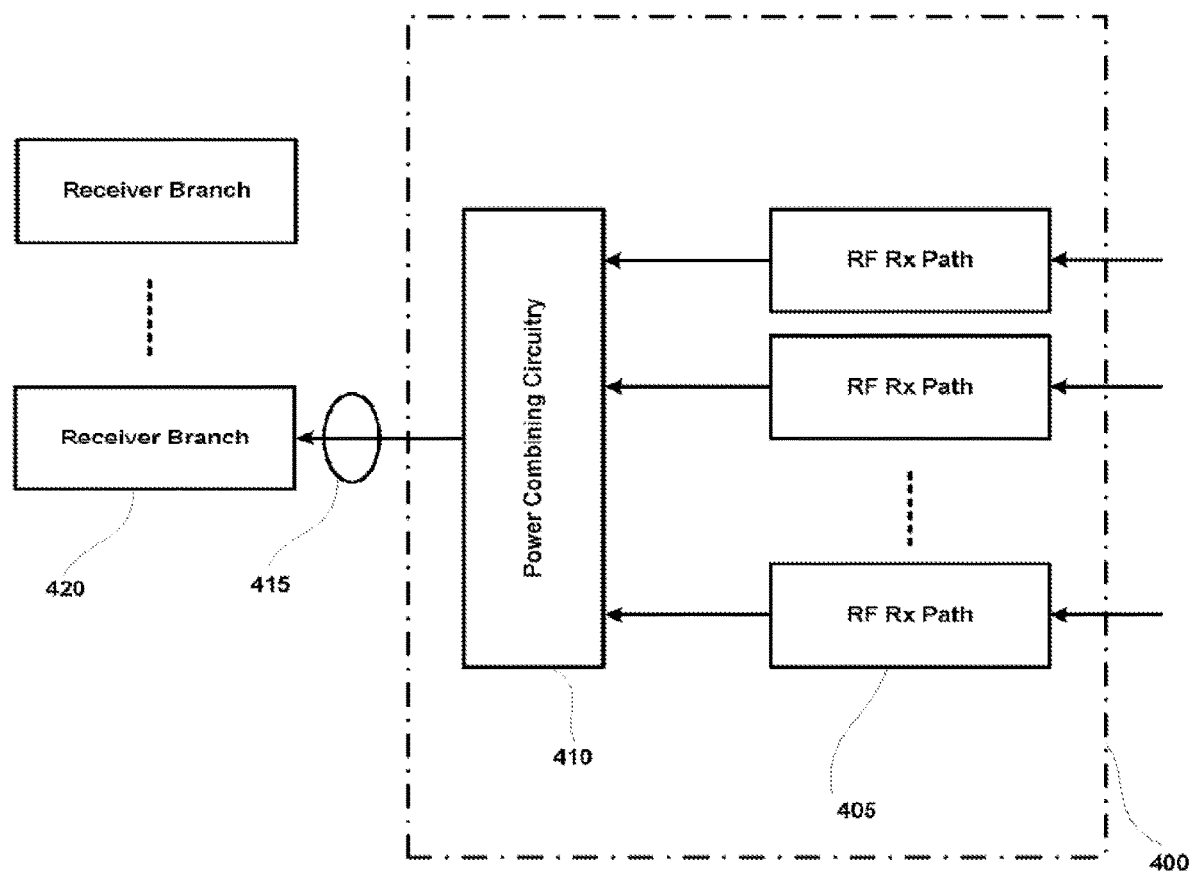
FIG. 4 schematically illustrates an exemplary radio frequency (RF) receiver circuitry according to some embodiments.

FIG. 4 schematically illustrates an exemplary RF receiver (Rx) circuitry 400 according to some embodiments. The Rx circuitry 400 may be similar to the RFFE 208, the receiver circuitry 206A, or a combination thereof. FIG. 4 may schematically illustrate how a receive beam is formed and processed by an RF front end and receiver circuitry.

RF Rx circuitry 400 may include one or more RF Rx paths 405, which in some embodiments may include one or more antennas, filters, low noise amplifiers, programmable phase shifters and power supplies (not shown). In some embodiments, each RF Rx path 405 may include or be coupled to an antenna panel comprising multiple antenna elements that may form a receive beam. The antenna panel may be similar to and substantially interchangeable with the antenna panel 165 in FIG. 1. An RF Rx path 405 may be coupled with a receiver branch for further received signal processing.

In some embodiments, multiple RF Rx paths 405 may be coupled to one antenna panel to form receive beams. RF Rx circuitry 400 may include power combining circuitry 410 in some embodiments. In some other embodiments, power combining circuitry 410 may operate bidirectionally, such that the same physical circuitry may be configured to operate as a power divider when the device is transmitting, and as a power combiner when the device is receiving. FIG. 4 focuses on the power combining aspect from the UE reception perspective. In some embodiments, power combining circuitry 410 may include wholly or partially separate circuitries to perform power combining when the device is receiving. In some embodiments, power combining circuitry 410 may include passive circuitry comprising one or more two-way power combiners arranged in a tree. In some embodiments, power combining circuitry 410 may include active circuitry comprising amplifier circuits.

In some embodiments, RF Rx circuitry 400 may be coupled with one or more receiver branches. A combined RF path interface 415 may connect a power combining circuitry 410 to a receiver branch 420. Multiple receiver branches may be connected to multiple power combining circuitry 410 via multiple combined RF path interfaces 415. One or more receiver branches 420 may constitute the receiver circuitry 206A.

In LTE, as aforementioned, RSRP may be used for measuring the received power level of a reference signal to indicate signal strength from one or more cells. RSRQ, RSSI and/or RS-SINR may be alternatively or additionally used for similar purposes. For simplicity of the discussion, only RSRP is illustrated as an example, but all the descriptions herein apply to the other reference signal measurements, as well as, but not limited to, RSRQ, RSSI and RS-SINR.

RSRP is defined as the linear average over the power contribution in Watt of the resource elements received at each antenna connector, which is associated with each receiver branch. When one or more diversity receiver branches are in use by the UE, the reported value shall not be lower than the corresponding RSRP of any of the individual diversity branches, according to TS 36.214.

In NR with respect to mmWave and/or sub-mmWave operation, receiver beamforming may be used by a UE receiver. In beamforming, each antenna of an antenna panel may receive a reference signal with respect to a cell. Two or more antennas of the panel may be in use for beamforming. The antennas may shift phases on individual received reference signals. The shifted phases may have different degrees corresponding to respective antennas in order to achieve a desired antenna gain for the received reference signal. The assigned phase shifts may be different due to different reference signal receive patterns, which may be affected by multiple factors, such as a UE location, frequency band and channel bandwidth, interference, etc. Once a receive beam is formed by the antenna panel, the receive beam may be received and further processed by a receiver branch. With respect to the same reference signal regarding a specific cell, more than one beam may be formed by the antenna panel. Then, a linear average over the receive beams in power measurements (measured in Waft) may be used to calculate the power level of the reference signal with respect to the same antennas associated with the same receiver branch. For an instance of RSRP, a corresponding value may be reported based on the calculation on the received power of the beams. Thus, both the UE and eNB may have knowledge of the received power level with respect to a receiver branch. Therefore, the UE and eNB may determine further operations based on this information.

In some embodiments, one or more diversity receiver branches may be implemented to enhance UE receiving capability. For example, a UE may have a number of 2×N receiving antennas (N is an integer and larger than 2). Then a number of N antennas may be used to form Rx beam 1 and another number of N antennas may be used to form Rx beam 2. The RSRP of Rx beam 1 is value x, and the RSRP of Rx beam 2 is value y. Then, the reported value of RSRP may be equal to the maximized value of x and y. Multiple diversity receiver branches may be used so that more than two RSRP values may be generated by measurements. Then the maximum value among all of the RSRP values may be reported to indicate the UE's RSRP regarding the particular cell.

In some embodiments, a UE may have one or more diversity receiver branches to receive multiple Rx beams, so that multiple RSRP values may be generated by RSRP measurements. Then an averaged value calculated based on all of the RSRP values may be reported. For example, values x, y, and z may be determined from RSRP measurements with respect to three beams received by three groups of antennas. The reported value may be calculated by averaging all three of them, (x+y+z)/3.

In some other embodiments, among multiple RSRP values, only a number of largest RSRP values but not all of the values may be used for averaging. For example, RSRP values x, y, and z have a relationship that z>y>x, and only the top two of the values may be used for averaging. Then the reported value may be calculated based on (z+y)/2.

In some embodiments, RSRQ, RSSI and/or RS-SINR may be used in a manner similar to that described above with respect to RSRP. In various embodiments, the reference signals may be primary synchronization signal (PSS), secondary synchronization signal (SSS), channel-state information reference signal (CSI-RS), demodulation reference signal (DM-RS), Phase tracking reference signal (PT-RS), cell-specific reference signal (CRS), and new radio reference signal (NR-RS).

In some embodiments, a UE may have one panel of antenna elements to form one or more Rx beams. Alternatively, a UE may have multiple panels of antenna elements to form multiple Rx beams. One or more panels may feed into one or more receiver branches.

Figure 5B:
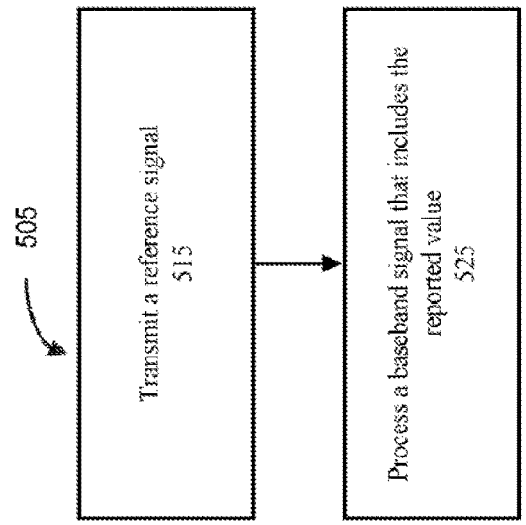
FIG. 5B illustrates an operation flow/algorithmic structure to facilitate the process of reference signal measurements from an eNB perspective, in accordance with some embodiments.
Figure 5A:
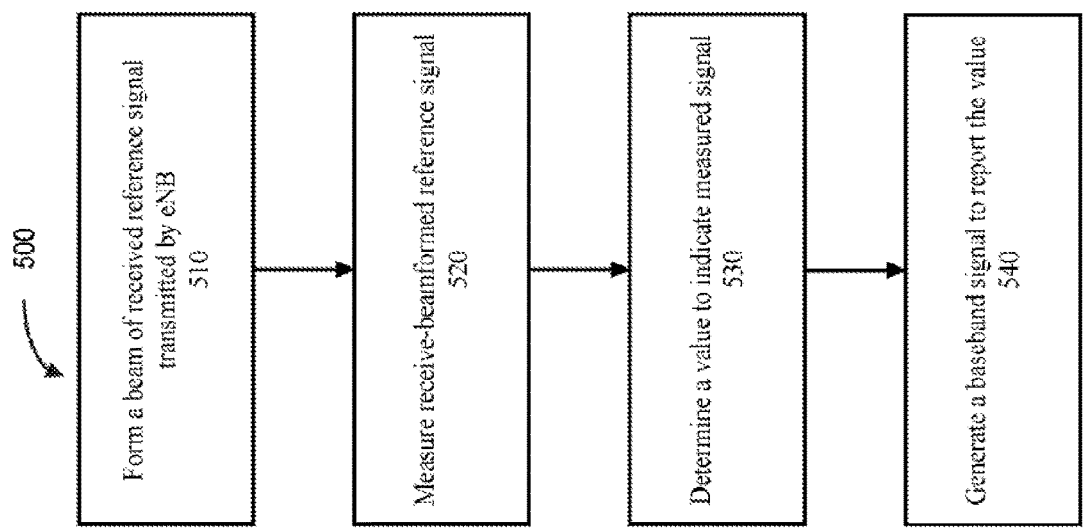
FIG. 5A illustrates an operation flow/algorithmic structure to facilitate a process of reference signal measurements by an UE in accordance with some embodiments.

FIG. 5A illustrates an operation flow/algorithmic structure 500 to facilitate a process of reference signal measurements by the UE 105 in accordance with some embodiments. The operation flow/algorithmic structure 500 may be performed by the UE 105 or circuitry thereof.

The operation flow/algorithmic structure 500 may include, at 510, forming a receive beam of the received reference signal by an antenna panel. The reference signal may be transmitted by an eNB 110 with respect to a cell. In some embodiments, forming the receive beam may include the one or more baseband processors controlling an RFFE 208 and the antenna panel to generate the receive beam. For example, the baseband circuitry may control respective phase shifting at each antenna element to achieve desired antenna gains. In some embodiments, multiple beams may be received by one panel of antennas. In some other embodiments, more than one receiver branch may be used for receiving. Therefore, more than one antenna panel may form more than one receive beam, which may be further received and processed by corresponding receiver branches. Receive beams may be receive-beamformed reference signals. In some embodiments, the reference signals may be PSS, SSS, CSI-RS, DM-RS, PT-RS, CRS, and NR-RS.

The operation flow/algorithmic structure 500 may further include, at 520, measuring receive-beamformed reference signals by the one or more baseband processors. The measurement may be referenced for individual receiver branches. In some embodiments, RSRP, RSRQ, RSSI and/ RS-SINR may be used for reference signal measurement.

The operation flow/algorithmic structure 500 may further include, at 530, determining one or more values to indicate respective measured receive-beamformed reference signals or measured receive beams with respect to individual receiver branches by a CPU coupled with the one or more baseband processors. In some embodiments, only one receiver branch may be used for receiving the one or more receiver beams. Then, only one corresponding value may be determined and reported accordingly. In some other embodiments, more than one receiver branch may be used for receiving more than one receiver beam. Thus, more than one value may be determined.

The operation flow/algorithmic structure 500 may further include, at 540, generating a baseband signal to report the value. This may be performed by the one or more baseband processors coupled with the CPU. In some embodiments, the CPU coupled with the one or more baseband processors may generate a report to include the value. In some embodiments, a maximum value of all the determined values may be reported. In another example, the reported value may not be lower than any of the determined values. In some other embodiments, the reported value may be an average value of all the determined values based on an averaging calculation. In some other embodiments, a number of the determined values may be selected for the averaging calculation. The number of determined values to be selected may be predetermined and equal to or larger than two, and the selected values are the largest values among all the determined values. The generated baseband signal may be transmitted to the eNB 110 as described above.

FIG. 5B illustrates an operation flow/algorithmic structure 505 to facilitate the process of reference signal measurements by the eNB 110 in accordance with some embodiments. The operation flow/algorithmic structure 505 may be performed by the eNB 110 or circuitry thereof, for example, baseband circuitry.

The operation flow/algorithmic structure 505 may include, at 515, transmitting a reference signal. In some embodiments, the reference signals may be PSS, SSS, CSI-RS, DM-RS, PT-RS, CRS, and NR-RS.

The operation flow/algorithmic structure 505 may further include, at 525, processing a baseband signal that includes the reported value from the UE 105.

Figure 6:
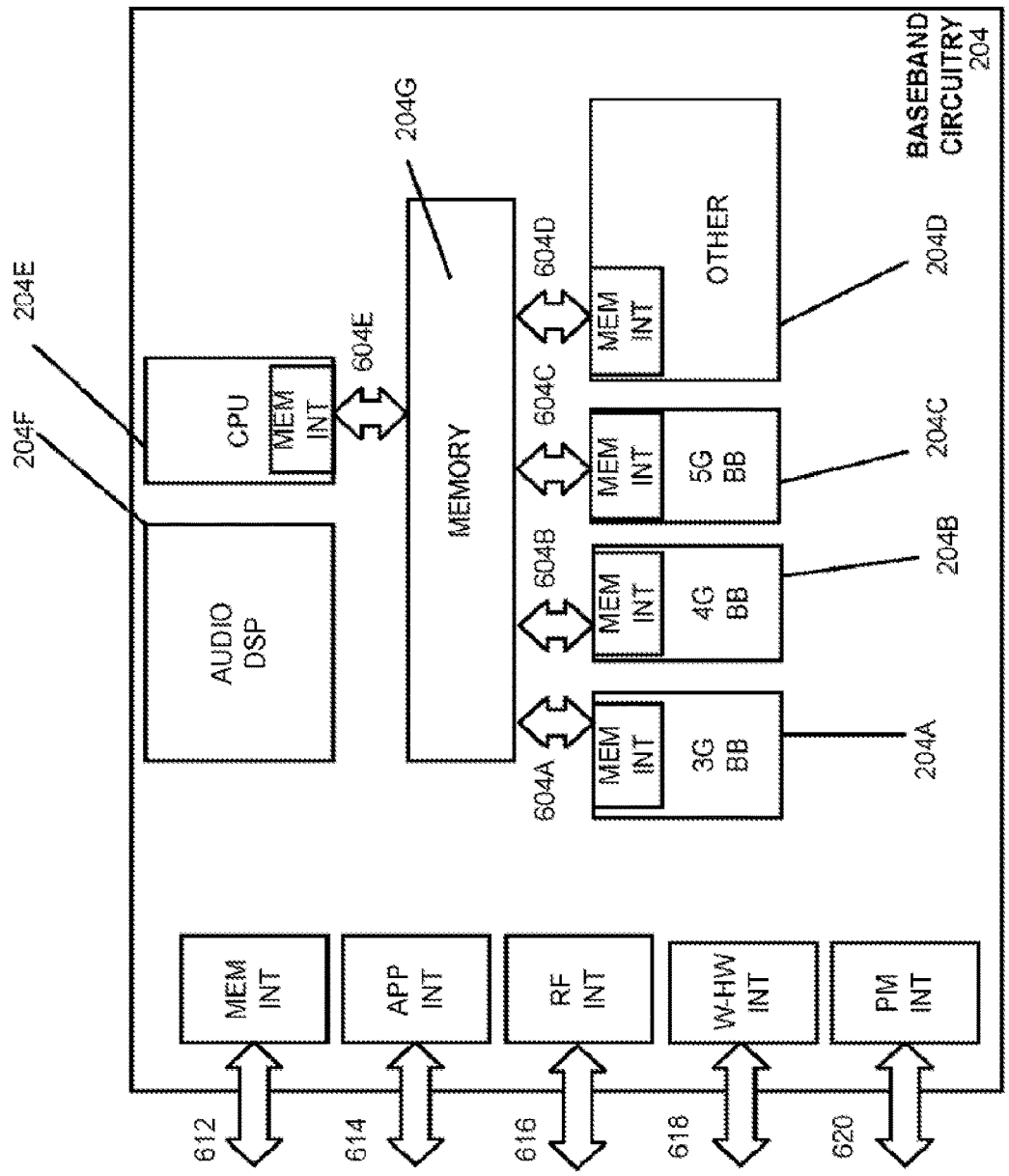
FIG. 6 illustrates example interfaces of baseband circuitry in accordance with some embodiments.

FIG. 6 illustrates example interfaces of baseband circuitry in accordance with some embodiments. As discussed above, the baseband circuitry 204 of FIG. 2 may comprise processors 204A-204E and a memory 204G utilized by said processors. Each of the processors 204A-204E may include a memory interface, 604A-604E, respectively, to send/receive data to/from the memory 204G.

The baseband circuitry 204 may further include one or more interfaces to communicatively couple to other circuitries/devices, such as a memory interface 612 (for example, an interface to send/receive data to/from memory external to the baseband circuitry 204), an application circuitry interface 614 (for example, an interface to send/receive data to/from the application circuitry 202 of FIG. 2), an RF circuitry interface 616 (for example, an interface to send/ receive data to/from RF circuitry 206 of FIG. 2), a wireless hardware connectivity interface 618 (for example, an interface to send/receive data to/from Near Field Communication (NFC) components, Bluetooth® components (for example, Bluetooth® Low Energy), Wi-Fi® components, and other communication components), and a power management interface 620 (for example, an interface to send/receive power or control signals).

Figure 7:
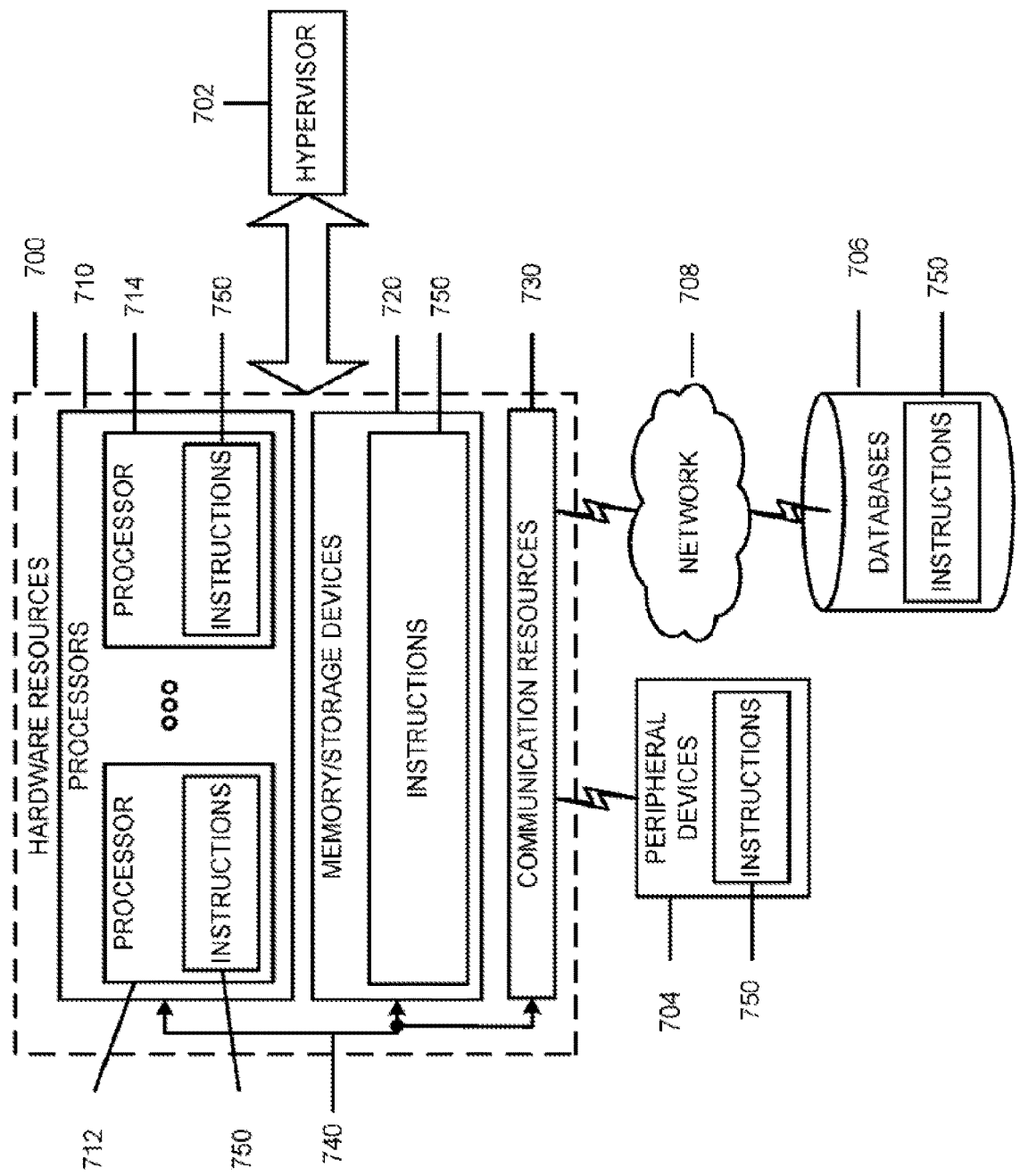
FIG. 7 illustrates hardware resources in accordance with some embodiments.

FIG. 7 is a block diagram illustrating components, according to some example embodiments, able to read instructions from a machine-readable or computer-readable medium (for example, a non-transitory machine-readable storage medium) and perform any one or more of the methodologies discussed herein. Specifically, FIG. 7 shows a diagrammatic representation of hardware resources 700 including one or more processors (or processor cores) 710, one or more memory/storage devices 720, and one or more communication resources 730, each of which may be communicatively coupled via a bus 740. For embodiments where node virtualization (for example, network function virtualization (NFV)) is utilized, a hypervisor 702 may be executed to provide an execution environment for one or more network slices/sub-slices to utilize the hardware resources 700.

The processors 710 (for example, a central processing unit (CPU), a reduced instruction set computing (RISC) processor, a complex instruction set computing (CISC) processor, a graphics processing unit (CPU), a digital signal processor (DSP) such as a baseband processor, an application specific integrated circuit (ASIC), a radio-frequency integrated circuit (RFIC), another processor, or any suitable combination thereof) may include, for example, a processor 712 and a processor 714.

The memory/storage devices 720 may include main memory, disk storage, or any suitable combination thereof. The memory/storage devices 720 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 730 may include interconnection or network interface components or other suitable devices to communicate with one or more peripheral devices 704 or one or more databases 706 via a network 708. For example, the communication resources 730 may include wired communication components (for example, for coupling via a Universal Serial Bus (USB)), cellular communication components, NFC components, Bluetooth® components (for example, Bluetooth® Low Energy), Wi-Fi® components, and other communication components.

Instructions 750 may comprise software, a program, an application, an applet, an app, or other executable code for causing at least any of the processors 710 to perform any one or more of the methodologies discussed herein. For example, in an embodiment in which the hardware resources 700 are implemented into the UE 105, the instructions 750 may cause the UE to perform some or all of the operation flow/algorithmic structure 500. In other embodiments, the hardware resources 700 may be implemented into the eNB 110.

The instructions 750 may cause the eNB 110 to perform some or all of the operation flow/algorithmic structure 505. The instructions 750 may reside, completely or partially, within at least one of the processors 710 (for example, within the processor's cache memory), the memory/storage devices 720, or any suitable combination thereof. Furthermore, any portion of the instructions 750 may be transferred to the hardware resources 700 from any combination of the peripheral devices 704 or the databases 706. Accordingly, the memory of processors 710, the memory/storage devices 720, the peripheral devices 704, and the databases 706 are examples of computer-readable and machine-readable media.

Some non-limiting Examples of various embodiments are provided below.

Example 1 may include one or more computer-readable media comprising instructions to, upon execution of the instructions by one or more processors of a UE, cause the UE to: measure a reference signal that is receive-beamformed by an antenna panel of a plurality of antennas; determine a value to indicate the measured reference signal; and generate a baseband signal to report the value.

Example 2 may include the one or more computer-readable media of example 1 and/or some other example herein, wherein upon execution, the instructions are to further cause the UE to: measure a plurality of the reference signals that are receive-beamformed by a respective plurality of antenna panels; determine a plurality of values to respectively indicate the plurality of measured reference signals; and generate a baseband signal to report the value based on a determination that the value is a maximum value among the determined plurality of values.

Example 3 may include the one or more computer-readable media of examples 1-2 and/or some other example herein, wherein upon execution, the instructions are to further cause the UE to control an RFFE of the UE to form, based on the reference signal received by the antenna panel, the receive-beamformed reference signal.

Example 4 may include the one or more computer-readable media of examples 1-3 and/or some other example herein, wherein the value corresponds to an SS-RSRP, or an SS-RSRQ.

Example 5 may include the one or more computer-readable media of example 4 and/or some other example herein, wherein the SS is a primary SS (PSS).

Example 6 may include the one or more computer-readable media of example 4 and/or some other example herein, wherein the SS is a secondary SS (SSS).

Example 7 may include the one or more computer-readable media of examples 1-3 and/or some other example herein, wherein the reference signal is an SS or a CSI-RS.

Example 8 may include the one or more computer-readable media of example 7 and/or some other example herein, wherein the value corresponds to an RS-SINR of the SS or the CSI-RS.

Example 9 may include the one or more computer-readable media of example 7 and/or some other example herein, wherein the value corresponds to an RSSI of the SS or the CSI-RS.

Example 10 may include the one or more computer-readable media of examples 1-3 and/or some other example herein, wherein the value corresponds to a CSI-RSRP or CSI-RSRQ.

Example 11 may include the one or more computer-readable media of examples 1-3 and/or some other example herein, wherein the reference signal is an NR-RS.

Example 12 may include the one or more computer-readable media of example 11 and/or some other example herein, and the value corresponds to, based on the NR-RS, an RSRP, RSRQ, RSSI, or RS-SINR.

Example 13 may include the one or more computer-readable media of examples 1-3 and/or some other example herein, wherein the reference signal is a DM-RS, PT-RS, or CRS.

Example 14 may include the one or more computer-readable media of example 13 and/or some other example herein, wherein the value corresponds to an RSRP, RSRQ, RSSI, or RS-SINR of the reference signal.

Example 15 may include the one or more computer-readable media of example 1 and/or some other example herein, wherein upon execution, the instructions are to further cause the UE to: measure a plurality of the reference signals that are receive beamformed by a respective plurality of antenna panels; generate an averaged value based on a plurality of values that respectively correspond to the plurality of measured reference signals; and generate the baseband signal to report the averaged value.

Example 16 may include the one or more computer-readable media of example 1 and/or some other example herein, wherein upon execution, the instructions are to further cause the UE to: measure a plurality of the reference signals that are receive beamformed by a respective plurality of antenna panels; select more than one value from a plurality of values that correspond to the plurality of measured reference signals, wherein any of the selected values is larger than any of the unselected values; generate an averaged value based on the selected values; and report the averaged value.

Example 17 may include one or more computer-readable media comprising instructions to, upon execution of the instructions by one or more processors of an eNB, cause the eNB to: process a transmission, transmit a reference signal to a UE; and process a baseband signal, transmitted by the UE, to determine a reported value to indicate a measurement of a receive-beamformed reference signal that is received by a receiver panel of the UE, wherein the receiver panel is to include a plurality of receiver antennas.

Example 18 may include the one or more computer-readable media of example 17 and/or some other example herein, wherein the reported value corresponds to a maximum value of a plurality of values to respectively indicate receive-beamformed reference signals that are received by a respective plurality of receiver panels.

Example 19 may include the one or more computer-readable media of example 18 and/or some other example herein, wherein the receive-beamformed reference signals are measured by RSRP, RSRP, RSSI or RS-SINR.

Example 20 may include the one or more computer-readable media of example 17 and/or some other example herein, wherein the reference signal is a PSS, SSS, CSI-RS, NR-RS, DM-RS, PT-RS, or CRS.

Example 21 may include a method comprising: measuring or causing to measure a reference signal that is receive-beamformed by an antenna panel of a plurality of antennas; determining or causing to determine a value to indicate the measured reference signal; and generating or causing to generate a baseband signal to report the value.

Example 22 may include the method of example 21 and/or some other example herein, wherein the method further comprises: measuring or causing to measure a plurality of the reference signals that are receive-beamformed by a respective plurality of antenna panels; determining or causing to determine a plurality of values to respectively indicate the plurality of measured reference signals; and generating or causing to generate a baseband signal to report the value based on a determination that the value is a maximum value among the determined plurality of values.

Example 23 may include the method of examples 21-22 and/or some other example herein, wherein the method further comprises forming or cause to form, based on the reference signal received by the antenna panel, the receive-beamformed reference signal.

Example 24 may include the method of examples 21-23 and/or some other example herein, wherein the value corresponds to an SS-RSRP or an SS-RSRQ.

Example 25 may include the method of example 24 and/or some other example herein, wherein an SS is a primary SS (PSS).

Example 26 may include the method of example 24 and/or some other example herein, wherein an SS is a secondary SS (SSS).

Example 27 may include the method of examples 21-23 and/or some other example herein, wherein the reference signal is an SS or a CSI-RS.

Example 28 may include the method of example 27 and/or some other example herein, wherein the value corresponds to an RS-SINR of the SS or the CSI-RS.

Example 29 may include the method of example 27 and/or some other example herein, wherein the value corresponds to an RSSI of the SS or the CSI-RS.

Example 30 may include the method of examples 21-23 and/or some other example herein, wherein the value corresponds to a CSI-RSRP or CSI-RSRQ.

Example 31 may include the method of examples 21-23 and/or some other example herein, wherein the reference signal is an NR-RS.

Example 32 may include the method of example 31 and/or some other example herein, and the value corresponds to, based on the NR-RS, an RSRP, RSRQ, RSSI, or RS-SINR.

Example 33 may include the method of examples 21-23 and/or some other example herein, wherein the reference signal is a DM-RS, PT-RS, or CRS.

Example 34 may include the method of example 33 and/or some other example herein, wherein the value corresponds to an RSRP, RSRQ, RSSI, or RS-SINR of the reference signal.

Example 35 may include the method of example 21 and/or some other example herein, wherein the method further comprises: measuring or causing to measure a plurality of the reference signals that are receive beamformed by a respective plurality of receiver panels; generating or causing to generate an averaged value based on a plurality of values that respectively correspond to the plurality of measured reference signals; and generating or causing to generate a baseband signal to report the averaged value.

Example 36 may include the method of example 21 and/or some other example herein, wherein the method further comprises: measuring or causing to measure a plurality of the reference signals that are receive beamformed by a respective plurality of receiver panels; selecting or causing to select more than one value from a plurality of values that correspond to the plurality of measured reference signals, wherein any of the selected values is larger than any of the unselected values; generating or causing to generate an averaged value based on the selected values; and generating or causing to generate a baseband signal to report the averaged value.

Example 37 may include a method comprising: processing or causing to process a transmission, transmit a reference signal to a UE; and processing or causing to process a baseband signal, transmitted by the UE, to determine a reported value to indicate a measurement of a receive-beamformed reference signal that is received by a receiver panel of the UE, wherein the receiver panel is to include a plurality of receiver antennas.

Example 38 may include the method of example 37 and/or some other example herein, wherein the reported value corresponds to a maximum value of a plurality of values to respectively indicate receive-beamformed reference signals that are received by a respective plurality of receiver panels.

Example 39 may include the method of example 38 and/or some other example herein, wherein the receive-beamformed reference signals are measured by RSRP, RSRP, RSSI or RS-SINR.

Example 40 may include the method of example 37 and/or some other example herein, wherein the reference signal is a PSS, SSS, CSI-RS, NR-RS, DM-RS, PT-RS, or CRS.

Example 41 may include an apparatus comprising means to perform one or more elements of a method described in or related to any of examples 21-40, or any other method or process described herein.

Example 42 may include one or more non-transitory computer-readable media comprising instructions to cause an electronic device, upon execution of the instructions by one or more processors of the electronic device, to perform one or more elements of a method described in or related to any of examples 21-40, or any other method or process described herein.

Example 43 may include an apparatus comprising logic, modules, and/or circuitry to perform one or more elements of a method described in or related to any of examples 21-40, or any other method or process described herein.

Example 44 may include a method, technique, or process as described in or related to any of examples 21-40, or portions or parts thereof.

Example 45 may include an apparatus comprising: one or more processors and one or more computer-readable media comprising instructions that, when executed by the one or more processors, cause the one or more processors to perform the method, techniques, or process as described in or related to any of examples 26-49, or portions thereof.

Example 46 may include an apparatus comprising: one or more baseband processors to measure, based on a reference signal that is received by a plurality of antenna panels, a plurality of receive beams that are formed by the respective plurality of panels, wherein the individual antenna panels are to include a plurality of antennas to respectively form the plurality of receive beams; and a central processing unit (CPU) coupled with the one or more baseband processors, the CPU to determine a plurality of values to respectively indicate the plurality of measured receive-beamformed reference signals, select a maximum value from the plurality of values, and generate a baseband signal to report the maximum value.

Example 47 may include the apparatus of example 46, and/or some other examples herein, wherein individual receive beams are respectively receive-beamformed by individual panels that are associated with individual receiver branches.

Example 48 may include the apparatus of examples 46-47, and/or some other examples herein, wherein the reference signal is a PSS, SSS, CSI-RS, NR-RS, DM-RS, PT-RS, or CRS.

Example 49 may include the apparatus of examples 46-48, and/or some other examples herein, wherein the values correspond to measurements of RSRP, RSRQ, RSSI, or RS-SINR of the individual receive beams.

Example 50 may include the apparatus of example 46, and/or some other examples herein, further comprising one or more antenna panels including a plurality of antennas respectively to: receive the reference signal and form, based on the received reference signal, one or more of the receive beams.

Example 51 may include the apparatus of example 46, and/or some other examples herein, further comprising one or more receiver branches, respectively connected with the plurality of antenna panels, the one or more receiver branches to receive the plurality of receive beams.

Example 52 may include the apparatus of example 46, and/or some other examples herein, wherein the CPU is further to generate an averaged value based on a plurality of values that respectively correspond to the plurality of measured receive beams; and report the averaged value.

Example 53 may include the apparatus of example 46, and/or some other examples herein, wherein the CPU is further to select more than one value from a plurality of values that correspond to the plurality of measured receive beams, wherein any of the selected values is larger than any of the unselected values; generate an averaged value based on the selected values; and report the averaged value.

Example 54 may include an apparatus of baseband circuitry of an eNB, to transmit a reference signal to a UE, and process a baseband signal, transmitted by the UE upon receiving the reference signal, to determine a reported value to indicate a measurement of a receive-beamformed reference signal that is received by a receiver panel of the UE, wherein the receiver panel is to include a plurality of receiver antennas.

Example 55 may include the apparatus of example 54 and/or some other examples herein, wherein the reference signal is a PSS, SSS, CSI-RS, NR-RS, DM-RS, PT-RS, or CRS.

The present disclosure is described with reference to flowchart illustrations or block diagrams of methods, apparatuses (systems) and computer program products according to embodiments of the disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flowchart or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart or block diagram block or blocks.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure, as those skilled in the relevant art will recognize.

What is claimed is:

1. An apparatus for a user equipment (UE) in a wireless network, the apparatus comprising:
one or more baseband processors to perform operations comprising:
receiving with beamforming, using one or more antenna panels of the UE, a plurality of instances of a reference signal comprising at least one of a primary synchronization signal (PSS) or a secondary synchronization signal (SSS), wherein the plurality of instances of the reference signal correspond to a plurality of receiver branches of the UE, each receiver branch of the plurality of receiver branches being associated with one or more beamformed instances of the reference signal;
for each receiver branch, measure a signal value based on the one or more respective instances of the reference signal, wherein the signal value corresponds to a synchronization signal-reference signal received power (SS-RSRP) or a synchronization signal-reference signal received quality (SS-RSRQ);
determining, among a plurality of measured signal values corresponding to the plurality of receiver branches, a particular signal value that is not lower than any of the plurality of measured signal values; and
generating a report including the particular signal value; and
a radio frequency (RF) circuit to perform operations comprising transmitting the report to a base station.

2. The apparatus of claim 1, wherein a receiver branch of the plurality of receiver branches is associated with one antenna panel of the one or more antenna panels.

3. The apparatus of claim 1, wherein determining the particular signal value comprises determining a maximum value among the plurality of measured signal values.

4. The apparatus of claim 1, wherein determining the particular signal value comprises:
selecting more than one value from a plurality of measured signal values, wherein any selected value is larger than any unselected value; and
averaging the selected values to determine the particular signal value.

5. The apparatus of claim 1, wherein the reference signal comprises one of a channel-state information-reference signal (CSI-RS), a new radio reference signal (NR-RS), a demodulation reference signal (DM-RS), a phase tracking reference signal (PT-RS), or a cell-specific reference signal (CRS).

6. The apparatus of claim 5, wherein the signal value measured for a receiver branch corresponds to one of reference signal received power (RSRP), reference signal received quality (RSRQ), reference signal strength indicator (RSSI), or reference signal-signal to noise plus interference ratio (RS-SINR) of individual beamformed instances of the reference signal.

7. An apparatus for a base station in a wireless network, the apparatus comprising:
one or more processors to perform operations comprising:
transmitting a plurality of instances of a reference signal to a user equipment (UE) in the wireless network, the plurality of instances received using a plurality of receiver beams of the UE, each receiver beam of the plurality of receiver beams generated using one or more antenna panels of a plurality of antenna panels of the UE, wherein the reference signal comprises one of a primary synchronization signal (PSS) or a secondary synchronization signal (SSS); and
receiving from the UE, a particular signal value corresponding to measurements by the UE of the plurality of instances of the reference signal, wherein the particular signal value corresponds to one of a synchronization signal-reference signal received power (SS-RSRP) or a synchronization signal-reference signal received quality (SS-RSRQ), and
wherein the particular signal value is not lower than any signal value measured by the UE of the plurality of instances of the reference signal.

8. The apparatus of claim 7, wherein the measurements by the UE of the plurality of instances of the reference signal correspond to a plurality of receiver branches of the UE, a receiver branch of the plurality of receiver branches being associated with one or more antenna panels of the plurality of antenna panels.

9. The apparatus of claim 8, wherein each receiver branch of the plurality of receiver branches is associated with one or more instances of the reference signal.

10. The apparatus of claim 7, wherein the particular signal value comprises one of:
a maximum value among signal values measured by the UE, or
average of a plurality of values selected from among the signal values measured by the UE, any selected value being larger than any unselected value.

11. The apparatus of claim 7, wherein the reference signal comprises one of a channel-state information-reference signal (CSI-RS), a new radio reference signal (NR-RS), a demodulation reference signal (DM-RS), a phase tracking reference signal (PT-RS), or a cell-specific reference signal (CRS).

12. The apparatus of claim 11, wherein the particular signal value corresponds to one of reference signal received power (RSRP), reference signal received quality (RSRQ), reference signal strength indicator (RSSI), or reference signal-signal to noise plus interference ratio (RS-SINR) of individual beamformed instances of the reference signal.

13. A method comprising:
receiving with beamforming, using one or more antenna panels of a user equipment (UE) in a wireless network, a plurality of instances of a reference signal comprising at least one of a primary synchronization signal (PSS) or a secondary synchronization signal (SSS), wherein the plurality of instances of the reference signal correspond to a plurality of receiver branches of the UE, each receiver branch of the plurality of receiver branches being associated with one or more beamformed instances of the reference signal;
for each receiver branch, measuring a signal value based on the one or more respective instances of the reference signal, wherein the signal value corresponds to a synchronization signal-reference signal received power (SS-RSRP) or a synchronization signal-reference signal received quality (SS-RSRQ);

determining, among a plurality of measured signal values corresponding to the plurality of receiver branches, a particular signal value that is not lower than any of the plurality of measured signal values; and transmitting a report including the particular signal value to a base station.

14. The method of claim 13, wherein a receiver branch of the plurality of receiver branches is associated with one antenna panel of the one or more antenna panels.

15. The method of claim 13, wherein determining the particular signal value comprises determining a maximum value among the plurality of measured signal values.

16. The method of claim 13, wherein determining the particular signal value comprises:

selecting more than one value from a plurality of measured signal values, wherein any selected value is larger than any unselected value; and averaging the selected values to determine the particular signal value.

17. The method of claim 13, wherein the reference signal comprises one of a channel-state information-reference signal (CSI-RS), a new radio reference signal (NR-RS), a demodulation reference signal (DM-RS), a phase tracking reference signal (PT-RS), or a cell-specific reference signal (CRS).

18. The method of claim 17, wherein the signal value measured for a receiver branch corresponds to one of reference signal received power (RSRP), reference signal received quality (RSRQ), reference signal strength indicator (RSSI), or reference signal-signal to noise plus interference ratio (RS-SINR) of individual beamformed instances of the reference signal.

19. A method comprising:

transmitting, using a base station in a wireless network, a plurality of instances of a reference signal to a user equipment (UE) in the wireless network, the plurality of instances received at the UE using a plurality of receiver beams of the UE, each receiver beam of the plurality of receiver beams generated using one or more antenna panels of a plurality of antenna panels of the UE, wherein the reference signal comprises one of a primary synchronization signal (PSS) or a secondary synchronization signal (SSS); and receiving from the UE, a particular signal value corresponding to measurements by the UE of the plurality of instances of the reference signal, wherein the particular signal value corresponds to one of a synchronization signal-reference signal received power (SS-RSRP) or a synchronization signal-reference signal received quality (SS-RSRQ), and wherein the particular signal value is not lower than any signal value measured by the UE of the plurality of instances of the reference signal.

20. The method of claim 19, wherein the measurements by the UE of the plurality of instances of the reference signal correspond to a plurality of receiver branches of the UE, a receiver branch of the plurality of receiver branches being associated with one or more antenna panels of the plurality of antenna panels.

21. The method of claim 20, wherein each receiver branch of the plurality of receiver branches is associated with one or more instances of the reference signal.

22. The method of claim 19, wherein the particular signal value comprises one of:

a maximum value among signal values measured by the UE, or average of a plurality of values selected from among the signal values measured by the UE, any selected value being larger than any unselected value.

23. The method of claim 19, wherein the reference signal comprises one of a channel-state information-reference signal (CSI-RS), a new radio reference signal (NR-RS), a demodulation reference signal (DM-RS), a phase tracking reference signal (PT-RS), or a cell-specific reference signal (CRS).

24. The method of claim 23, wherein the particular signal value corresponds to one of reference signal received power (RSRP), reference signal received quality (RSRQ), reference signal strength indicator (RSSI), or reference signal-signal to noise plus interference ratio (RS-SINR) of individual beamformed instances of the reference signal.

* * * * *